No. 652,006.  
J. C. RANTZ.  
AUTOMOBILE.  
(Application filed Sept. 16, 1899.)  
Patented June 19, 1900.
(No Model.)
2 Sheets—Sheet 1.
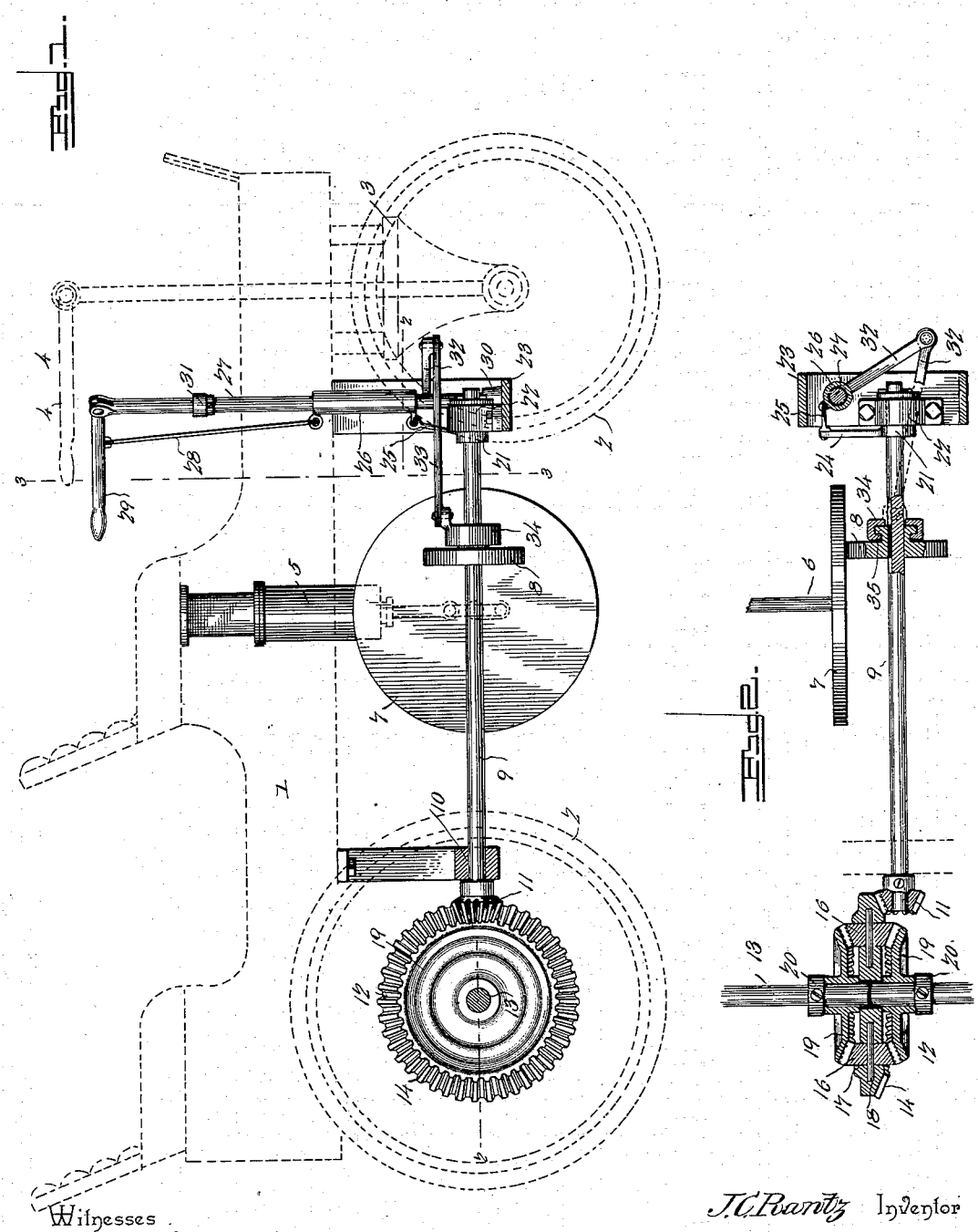

No. 652,006. Patented June 19, 1900.
J. C. RANTZ.
AUTOMOBILE.
(Application filed Sept. 16, 1899.)
(No Model.) 2 Sheets—Sheet 2.
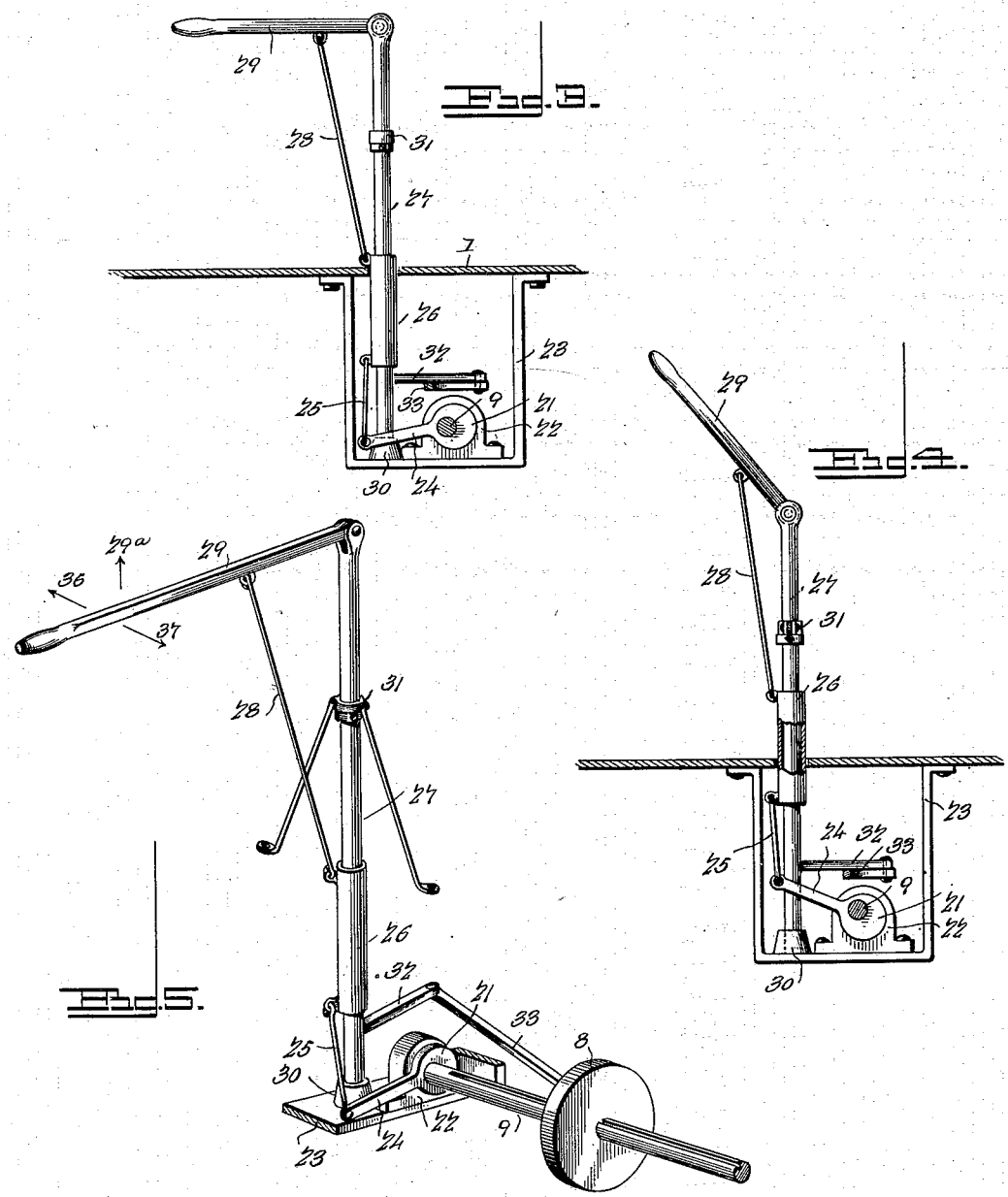
Witnesses  J. C. Rantz Inventor
By his Attorneys,

UNITED STATES PATENT OFFICE.

JOHN CHRISTIAN RANTZ, OF WILLIAMSPORT, PENNSYLVANIA.

AUTOMOBILE.

SPECIFICATION forming part of Letters Patent No. 652,006, dated June 19, 1900.

Application filed September 16, 1899. Serial No. 730,750. (No model.)

*To all whom it may concern:*

Be it known that I, JOHN CHRISTIAN RANTZ, a citizen of the United States, residing at Williamsport, in the county of Lycoming and State of Pennsylvania, have invented a new and useful Improvement in Automobiles, of which the following is a specification.

My present invention relates to improvements in automobiles—a class of vehicles which carry some form of motor operatively connected with the running-gear and controlling mechanism for governing the speed and direction of the vehicle.

The object of the present invention is to produce a simple form of gearing and controlling mechanism to permit the vehicle to be stopped, started, reversed, and controlled as to speed by the manipulation of a single controlling-lever which when urged in various directions will effect the desired results.

Referring to the drawings, Figure 1 is a side elevation, partly in section, of my automobile driving and controlling mechanism complete, the vehicle being diagrammatically illustrated in dotted outline. Fig. 2 is a sectional view on the line 2 2 of Fig. 1, certain of the parts being shown in elevation. Fig. 3 is a sectional view, partly in elevation, on the line 3 3 of Fig. 1. Fig. 4 is a view similar to Fig. 3, but showing the controlling-lever elevated and the eccentric bearing rocked to cause the disengagement of the friction-gears; and Fig. 5 is a perspective view of so much of the mechanism as is necessary to illustrate the means for moving the shifting gear in directions longitudinal and transverse with respect to the driving-shaft.

Referring to the numerals of reference employed to designate corresponding parts in the several views, 1 indicates the vehicle-body, and 2 the wheels thereof, supporting the body and propelling mechanism. The front wheels 2 are, as usual, mounted upon a swiveled truck 3, arranged to be swung to guide the vehicle by a guiding-lever 4 or other similar device, these elements being diagrammatically illustrated in order to make the description complete, as they constitute no part of the invention.

Mounted at any point upon the vehicle-body, preferably intermediate of the front and rear wheels, is a motor 5, of any desired form, operatively connected with a power-shaft 6, extending transversely under the vehicle-body and having keyed to its end a comparatively-large friction gear or disk 7. This gear is designed to frictionally contact with what may be termed the "shifting" or "controlling" gear 8, mounted upon the driving-shaft 9 and capable of longitudinal movement thereon. The driving-shaft passes through a bearing 10 adjacent to its rear end, and at its rear extremity is keyed a comparatively-small bevel-gear 11, meshing with compensating gearing designed to transmit rotary motion to the rear axle or shaft 13, carrying the vehicle-wheels 2. The shaft 13 is divided, as shown in Fig. 2 of the drawings, and the compensating gearing consists of a bevel-gear 14, mounted loosely upon the adjacent ends of the shaft-sections and meshing with the gear 11, carried by the shaft 9. Pinions 16, having their axes radially disposed with respect to the shaft 13, are independently and rotatably mounted in the opening 17 in the gear 14 upon shafts 18, and these pinions are in mesh above and below the gear 14 with oppositely-disposed beveled gears 19, fixed upon the sections of the shaft 13 and held in place through the medium of attaching means carried by the hubs 20 thereof. With this construction of compensating gearing it will be seen that when the front wheels of the vehicle are adjusted to carry the vehicle straight ahead the sections of the shaft 13 will be prevented from uneven rotation because of the engagement of the wheels 2 with the surface of the ground. Therefore the gears 19 must rotate evenly, and the meshing of the pinions 16 with these gears 19 will act to drag them around with the gear 14, thus driving the machine straight forward. If, however, the front steering-wheels be turned in either direction, the wheel on the off side will have a longer path over which to travel, and hence will rotate more rapidly than the wheel at the inner side. Under these conditions the pinion 16 will rotate to revolve the shaft-sections at different rates of speed corresponding to the paths over which their wheels have to travel. By this means all slipping of the inner wheel on a turn and torsional strain upon the shaft, due to tendency of uneven rotation, will be prevented. Now it will appear that as power is transmitted to the driving-shaft 9 from the power-shaft 6 through the gears 7 and 8 the speed and direction of rotation of the former will be governed by the location of the shifting gear 8 at various distances from the axis of the gear 7 or upon opposite sides thereof. It is for the purpose of effecting this variable connection between the gears that I have mounted the gear 8 longitudinally movable upon the shaft, and I have further arranged the bearings of the shaft 9 to permit it to move laterally for the purpose of connecting or disconnecting the gears to start or stop the vehicle. Therefore in order to have the vehicle entirely under the control of the operator it is simply necessary to employ some simple form of mechanism for shifting the gear 8 to vary its connection with the gear 7 or entirely disconnect it therefrom, and I shall now proceed to describe what I consider to be a preferred form of such mechanism.

21 indicates what may be termed an "eccentric rocking bearing" revolubly mounted in a bracket 22, supported, as, for instance, in a frame 23, depending from the bottom of the vehicle-body. In this bearing is eccentrically journaled the front end of the driving-shaft 9, and from the bearing projects an arm 24, the outer end of which is connected through a link 25 with a movable sleeve 26, mounted upon a vertical rock-shaft 27 and connected through a second link 28 with the controlling-lever 29, pivoted at the upper end of the rock-shaft 27 and within reach of the occupants of the vehicle. The elevation of the controlling-lever 29 in the direction indicated by the arrow 29ª in Fig. 5 of the drawings will raise the sleeve 26 and, through the link 25 and bearing-arm 24, will rock the bearing and effect the transverse movement of the front end of the driving-shaft 9, thereby moving the shifting gear 8 out of contact with the contiguous face of the power-gear 7. Obviously a reversal of this operation will operatively connect the power and shifting gears to permit the transmission of power from the motor to the vehicle-wheels.

The rock-shaft 27 is stepped in a cup-bearing 30 within the frame 23 and may or may not be provided with a bearing 31 above the floor of the vehicle, as it will be seen that the sleeve 26, passing through the vehicle-floor, while movable upon also acts as a bearing for this shaft.

32 indicates what may be termed a "shifting lever" extending from the rock-shaft 27 adjacent to its lower end and pivoted at its outer extremity to one end of a pitman 33, pivotally connected at its opposite extremity to a flanged collar 34, concentric with the driving-shaft 9 and revolubly engaged by the flanged hub 5 of the shifting gear 8.

Referring now to the operation of my invention, we will suppose that the device is organized as illustrated in Fig. 1 and that the vehicle is being propelled. If it is desired to decrease or increase the speed of the vehicle, the rock-shaft 27 will be partially rotated by swinging the controlling-lever in the direction indicated by the arrow 36 or 37, which causes the oscillation of the shifting lever 32 and shifts the gear 8 longitudinally upon the shaft 9 to cause the engagement of the shifting gear with the face of the power-gear 7 nearer to or farther from the axis of the latter. The reversal of the direction of rotation of the shaft 9 to cause the reversal of movement of the vehicle is effected by shifting the gear 8 to the opposite side of the axis of the gear 7 in a manner which will appear obvious from the preceding description. When it is desired to stop the vehicle, the controlling-lever is elevated, as heretofore described, and the gears are disconnected by the slight lateral movement imparted to the shaft 9 through the rotation of the eccentric bearing. Thus I am enabled to control the direction and speed of an automobile by the operation of a single lever connected with a simple, inexpensive, and highly-efficient form of gearing; but while the structural features illustrated and described appear at this time to be preferable I desire to reserve the right to effect such changes, modifications, and variations as may come properly within the scope of the protection prayed.

What I claim is—

1. In an automobile, the combination with power and driving shafts, of a friction-wheel upon the power-shaft, a driving-gear longitudinally movable on the driving-shaft, a lever having connection with the driving-gear for moving it longitudinally of its shaft across the face of the friction-gear, and connections between said lever and the driving-shaft for moving said shaft toward and away from the friction-gear to engage and disengage the driving-gear with respect to the friction-gear.

2. In an automobile, the combination with power and driving shafts, of a friction-gear on the power-shaft, said power-shaft being movable toward and away from the friction-gear, a driving-gear longitudinally movable on the driving-shaft, a rock-shaft connected with the driving-shaft and adapted to move it to engage and disengage the driving-gear with respect to the friction-gear, a lever pivoted to the rock-shaft for operating it, a sleeve upon the rock-shaft, connections between the sleeve and the driving-gear for moving the latter across the face of the friction-gear, and connections between the sleeve and the lever for operating the sleeve.

3. In an automobile, the combination with power and driving shafts, of a comparatively-large friction-gear on the power-shaft, a driving-gear longitudinally movable on the driving-shaft, an eccentric bearing at one end of the driving-shaft and provided with a radial bearing-arm, a rock-shaft extending through the bottom of the vehicle and provided with a shifting lever, a pitman intermediate of the shifting lever and driving-gear, a sleeve movable upon the rock-shaft, a controlling-lever pivoted at the upper end of the rock-shaft, and links connecting the sleeve with the controlling-lever and bearing-arm respectively.

In testimony that I claim the foregoing as my own I have hereto affixed my signature in the presence of two witnesses.

JOHN CHRISTIAN RANTZ.

Witnesses:
  JOHN E. CUPP,
  W. A. BENTON.